(12) United States Patent
Jain et al.

(10) Patent No.: US 10,397,195 B2
(45) Date of Patent: Aug. 27, 2019

(54) METHOD AND SYSTEM FOR SHARED KEY AND MESSAGE AUTHENTICATION OVER AN INSECURE SHARED COMMUNICATION MEDIUM

(71) Applicant: Robert Bosch GmbH, Stuttgart (DE)

(72) Inventors: Shalabh Jain, Pittsburgh, PA (US); Jorge Guajardo Merchan, Pittsburgh, PA (US); Xinxin Fan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 15/211,767

(22) Filed: Jul. 15, 2016

(65) Prior Publication Data

US 2017/0019251 A1    Jan. 19, 2017

Related U.S. Application Data

(60) Provisional application No. 62/193,720, filed on Jul. 17, 2015, provisional application No. 62/193,724, filed on Jul. 17, 2015.

(51) Int. Cl.
*H04L 29/06* (2006.01)
*H04L 9/08* (2006.01)
(Continued)

(52) U.S. Cl.
CPC ........ *H04L 63/0428* (2013.01); *H04L 9/0816* (2013.01); *H04L 9/0838* (2013.01);
(Continued)

(58) Field of Classification Search
CPC ....... H04L 67/10; H04L 9/0816; H04L 12/66; H04L 9/14; H04L 69/22; H04L 63/0428;
(Continued)

(56) References Cited

U.S. PATENT DOCUMENTS

| 5,440,524 A | * | 8/1995 | Devanney | ............... | G11C 8/12 |
| | | | | | 365/189.11 |
| 7,421,582 B2 | * | 9/2008 | Fu | ........................ | H04W 12/06 |
| | | | | | 713/150 |

(Continued)

FOREIGN PATENT DOCUMENTS

| DE | 102015207220 A1 | 10/2015 |
| DE | 102014212228 A1 | 12/2015 |

(Continued)

OTHER PUBLICATIONS

Ateniese, Giuseppe et al., "Authenticated Group Key Agreement and Friends", in proceedings of 5th ACM Conference on Computer and Communications Security, Nov. 1998 (10 pages).
Bellare, Mihir et al., "A Modular Approach to the Design and Analysis of Authentication and Key Exchange Protocols", in proceedings of 30th Annual Symposium on the Theory of Computing, ACM Press, 1998, pp. 419-428 (10 pages).
(Continued)

*Primary Examiner* — Jahangir Kabir
(74) *Attorney, Agent, or Firm* — Maginot Moore & Beck LLP

(57) ABSTRACT

A method for shared key generation with authentication in a gateway node includes generating, generating a first set of pseudo-random data corresponding to expected transmissions from a first node that communicates with a second node through a shared communication medium, identifying, with the gateway node, bits transmitted from the second node based on a signals received by the gateway node corresponding to simultaneous transmissions from the first node and the second node, identifying, with the gateway node, expected bit values for the bits from the second node based on a combination of shared secret data stored in a memory of the gateway node with another set of random or pseudo-random data generated by the second node, and authenticating the second node in response to the plurality of bits transmitted from the second node matching the plurality of expected bit values.

6 Claims, 8 Drawing Sheets

(51) Int. Cl.
*H04L 9/14* (2006.01)
*H04L 12/66* (2006.01)
*H04L 12/40* (2006.01)
*H04L 29/08* (2006.01)
*H04L 9/12* (2006.01)

(52) U.S. Cl.
CPC .............. *H04L 9/0861* (2013.01); *H04L 9/12* (2013.01); *H04L 9/14* (2013.01); *H04L 12/40* (2013.01); *H04L 12/66* (2013.01); *H04L 63/06* (2013.01); *H04L 63/08* (2013.01); *H04L 67/10* (2013.01); *H04L 69/22* (2013.01); *H04L 2012/40215* (2013.01)

(58) Field of Classification Search
CPC ......... H04L 12/40; H04L 63/06; H04L 63/08; H04L 2012/40215
USPC .......................................... 713/153, 168–171
See application file for complete search history.

(56) References Cited

U.S. PATENT DOCUMENTS

| | | | |
|---|---|---|---|
| 7,424,615 | B1 | 9/2008 | Jalbert et al. |
| 8,868,912 | B2 * | 10/2014 | Blom ................. H04L 63/0435 713/171 |
| 10,104,545 | B2 * | 10/2018 | Chen .................... H04W 12/06 |
| 2003/0051140 | A1 * | 3/2003 | Buddhikot ........... H04L 63/062 713/169 |
| 2004/0077335 | A1 * | 4/2004 | Lee ........................ H04L 63/08 455/410 |
| 2008/0046732 | A1 | 2/2008 | Fu et al. |
| 2008/0141030 | A1 | 6/2008 | Patrick |
| 2009/0307496 | A1 | 12/2009 | Hahn et al. |
| 2010/0250995 | A1 | 9/2010 | Savitzky et al. |
| 2013/0151852 | A1 * | 6/2013 | Bian .................... H04W 12/06 713/168 |
| 2017/0019382 | A1 | 1/2017 | Jain et al. |
| 2018/0206117 | A1 * | 7/2018 | Stahl ................. H04L 63/0823 |

FOREIGN PATENT DOCUMENTS

| | | | |
|---|---|---|---|
| WO | 2014159189 | A1 | 10/2014 |
| WO | 2016188707 | A1 | 12/2016 |

OTHER PUBLICATIONS

Bellare, Mihir et al., "Entity Authentication and Key Distribution", Advances in Cryptology—CRYPTO '93, Lecture Notes in Computer Science vol. 773 , pp. 232-249, 1994 (18 pages).
Bird, Ray et al., "Systematic Design of Two-Party Authentication Protocols", Advances in Cryptology—CRYPTO '91, Lecture Notes in Computer Science vol. 576, pp. 44-61, 1992 (18 pages).
Bresson, Emmanuel et al., "Provably Secure Authenticated Group Diffie-Hellman Key Exchange", ACM Transactions on Information and System Security, vol. 10, No. 3, Jul. 2007 (45 pages).
Canetti, Ran et al., "Universally Composable Notions of Key Exchange and Secure Channels", EUROCRYPT 2002, Lecture Notes on Computer Science vol. 2332, pp. 337-351, 2002 (15 pages).
Diffie, Whitfield et al., "Authentication and Authenticated Key Exchanges", Designs, Codes and Cryptography, vol. 2, No. 2, pp. 107-125, 1992 (19 pages).
Harn, Lein et al., "Authenticated Group Key Transfer Protocol Based on Secret Sharing", IEEE Transactions on Computers, vol. 59, No. 6, pp. 842-846, Jun. 2010 (5 pages).
Katz, Jonathan et al., "Efficient and Secure Authenticated Key Exchange Using Weak Passwords", Journal of the ACM, vol. 57, No. 1, Nov. 2009 (39 pages).
Katz, Jonathan et al., "Scalable Protocols for Authenticated Group Key Exchange", CRYPTO2003, Lecture Notes on Computer Science vol. 2729, pp. 110-125, 2003 (16 pages).
Mueller, Andreas et al., "Plug-and-secure communications for CAN", IEEE International Conference on Communications, Jun. 2015 (9 pages).
International Search Report and Written Opinion corresponding to PCT Application No. PCT/US2016/042626, dated Oct. 14, 2016 (10 pages).
Supplementary European Search Report corresponding to European Patent Application No. 16 82 8329 (11 pages).
Kurachi, R. et al., "CaCAN—Centralized Authentication System in CAN (Controller Area Network)," 2014, retrieved from Internet: https://www.researchgate.net/publication/320083914_CaCAN__Centralized_Authentication_System_in_CAN (9 pages).
Wang, Q. et al., "VeCure: A Practical Security Framework to Protect the CAN Bus of Vehicles," 2014 International Conference on the Internet of Things (IOT), 2014 (6 pages).

* cited by examiner

METHOD AND SYSTEM FOR SHARED KEY AND MESSAGE AUTHENTICATION OVER AN INSECURE SHARED COMMUNICATION MEDIUM

CLAIM OF PRIORITY

This application claims priority to U.S. Provisional Patent No. 62/193,724, which is entitled "Authenticated Key Agreement over a Network," and was filed on Jul. 17, 2015, the entire contents of which are hereby incorporated by reference herein. This application claims further priority to 62/193,720, which is entitled "Group Key Agreement Over a Network," and was filed on Jul. 17, 2015, the entire contents of which are hereby incorporated by reference herein.

CROSS REFERENCE

This application cross-references U.S. application Ser. No. 15/211,533, which is entitled "METHOD AND SYSTEM FOR SECURE KEY GENERATION OVER AN INSECURE SHARED COMMUNICATION MEDIUM," and was filed on Jul. 15, 2016, the entire contents of which are hereby incorporated by reference herein.

FIELD

This disclosure relates generally to the field of network communications and, more specifically, to systems and methods for authentication during a shared key generation process for secure communication in network communication systems.

BACKGROUND

Many communication systems rely on cryptography to ensure message secrecy and authenticity for communications that occur between two or more network communication nodes. In particular, some networks that employ a shared communication medium are susceptible to eavesdropping by attackers who can receive any encrypted or non-encrypted communications.

Prior art embodiments enable encrypted communications using either public-key/private-key or symmetric key cryptographic systems. However, for many applications, such as embedded systems, the public-key/private-key prior art techniques are impractically complex. Symmetric key cryptography, in which two or more parties use a single shared secret key to perform cryptographic operations, is often preferable to enable two or more nodes that use a shared communication bus to generate shared keys even in the presence of an attacker. However, some attackers may reduce the effectiveness of shared key generation processes by becoming an impostor for a legitimate node and participating in the same shared key generation process as the other nodes in the network to determine the shared key. Consequently, improvements to key generation techniques that enable authentication of the nodes that participate in the generation of shared secret keys over a shared communication medium that is susceptible to an attacker would be beneficial.

SUMMARY

In one embodiment a method for authentication of nodes that participate in a shared key generation process has been developed. The method includes generating, with a processor in a gateway node communicatively connected to a first node and a second node through a shared communication medium, a first set of pseudo-random data corresponding to expected transmissions from the first node based on a predetermined one-way function applied to a first shared key between the first node and the gateway node, identifying, with the processor in the gateway node, a plurality of bits transmitted from the second node based on a plurality of signals received by a transceiver in the gateway node communicatively connected to the shared communication medium, the plurality of signals corresponding to a plurality of simultaneous transmissions from the first node and the second node, identifying, with the processor in the gateway node, a plurality of expected bit values for at least a portion of the second plurality of bits transmitted from the second node based at least in part on applying the predetermined one-way function to a combination of shared secret data between the gateway node and the second node stored in a memory of the gateway node with another set of random data generated by the second node, and authenticating, with the processor in the gateway node, the second node in response to the plurality of bits transmitted from the second node matching the plurality of expected bit values.

In a further embodiment, the identifying the plurality of bits transmitted from the second node includes receiving with the transceiver in the gateway node a first signal from the shared communication medium corresponding to a simultaneous transmission of a first bit from the first node and a second bit from the second node, receiving with the transceiver in the gateway node a second signal from the shared communication medium corresponding to a simultaneous transmission of a logical complement of the first bit from the first node and a logical complement of the second bit from the second node, and identifying, with the processor in the gateway node, one bit in the plurality of bits transmitted from the second node with reference to the first signal and the second signal.

A further embodiment includes identifying, with the processor in the gateway node, the one bit in the plurality of bits transmitted from the second node being a logical complement of a corresponding bit in the first set of pseudo-random data for the first node in response to a first level of the first signal and a second level of the second signal being the same.

In a further embodiment, the generation of the plurality of expected bit values includes identifying, with the processor in the gateway node, a first predetermined number N of the plurality of bits transmitted from the second node based on the plurality of signals received by a transceiver in the gateway node, generating, with the processor in the gateway node, a first predetermined set of N bits by applying the one-way function to a combination of the shared secret data and a plurality of leaked bits of data produced by transmissions between the gateway node and the first node prior to the plurality of simultaneous transmissions from the first node, the transmissions corresponding to the plurality of leaked bits being received by the second node through the shared communication medium, identifying, with the processor in the gateway node, a plurality of random bits generated in the second node by performing an exclusive-or (XOR) operation between the first predetermined set of N bits and the first predetermined number N of the plurality of bits transmitted from the second node, and generating, with the processor in the gateway node, the plurality of expected bit values by applying the one-way function to a combination of the shared secret data and the plurality of random bits generated in the second node.

A further embodiment includes generating, with a random number generator in the gateway node, a plurality of random bits of data, exchanging, with the transceiver in the gateway node the plurality of random bits with the first node by transmitting the plurality of random bits while receiving another plurality of random bits during simultaneous transmissions from the first node to produce a plurality of shared bits between the gateway node and the first node, generating, with the processor in the gateway node, the first shared key between the gateway node and the first node by applying the one-way function to a combination of shared secret data between the gateway node and the first node stored in the memory of the gateway node and the plurality of shared bits between the gateway node and the first node, generating, with the random number generator in the gateway node, a nonce value, generating, with the processor in the gateway node, an encrypted version of the nonce value using the first shared key, transmitting, with the transceiver in the gateway node, the encrypted version of the nonce value to the first node, receiving, with the transceiver in the gateway node, a transformed nonce value from the first node, the transformed nonce corresponding to a predetermined numeric transformation applied to the nonce value by the first node after the first node decrypts the encrypted version of the nonce using the first shared key, and authenticating, with the processor in the gateway node, the first node in response to the transformed nonce value received from the first node matching another transformed nonce value generated by the processor in the gateway node applying the predetermined numeric transformation to the nonce value generated by the random number generator in the gateway node.

In a further embodiment, the processor in the gateway node increments the nonce value generated by the random number generator in the gateway node by a predetermined value to match the transformed nonce value received from the first node.

A further embodiment includes transmitting, with the transceiver in the gateway node, a message to cancel generation of the shared key between the first node and the second node in response to identifying, with the processor in the gateway node, at least one bit in the second plurality of bits transmitted from the second node that does not match a corresponding bit in the plurality of expected bit values.

In a further embodiment, the transceiver in the gateway node receives the plurality of signals through a Controller Area Network bus shared communication medium.

In another embodiment a method for authentication of nodes that participate in a shared key generation process has been developed. The method includes generating, with a random number generator in a gateway node communicatively connected to a first node and a second node through a shared communication medium, a first set of random data, transmitting, with a transceiver in the gateway node, a first plurality of signals corresponding to the first set of random data to the first node and the second node through the shared communication medium, receiving, with the transceiver in the gateway node, a second plurality of signals corresponding to simultaneous transmissions of a first plurality of bits from first node and a second plurality of bits from the second node to generate a shared key between the first node and the second node, identifying, with a processor in the gateway node, a first plurality of expected bits to be transmitted from the first node by applying a one-way function to a combination of first shared secret data between the gateway node and the first node stored in a memory of the gateway node and the first set of random data, and authenticating, with the processor in the gateway node, the first node in response to the first plurality of bits received from first node matching the first plurality of expected bits.

A further embodiment includes identifying, with the processor in the gateway node, a second plurality of expected bits to be transmitted from the second node by applying the one-way function to a combination of second shared secret data between the gateway node and the second node stored in the memory of the gateway node and the first set of random data, and authenticating, with the processor in the gateway node, the second node in response to the second plurality of bits received from second node matching the second plurality of expected bits.

In a further embodiment, the receiving of the second plurality of signals includes receiving, with the transceiver in the gateway node, the second plurality of signals through a Controller Area Network bus shared communication medium.

In another embodiment a method for authentication of nodes that participate in a shared key generation process has been developed. The method includes generating, with a random number generator in a gateway node, a plurality of random bits of data, exchanging, with a transceiver in the gateway node the plurality of random bits with a first node by transmitting the plurality of random bits while receiving another plurality of random bits during simultaneous transmissions from the first node through a shared communication medium to produce a plurality of shared bits between the gateway node and the first node, generating, with the processor in the gateway node, a first shared key between the gateway node and the first node by applying a one-way function to a combination of shared secret data between the gateway node and the first node stored in a memory of the gateway node and the plurality of shared bits between the gateway node and the first node, generating, with the random number generator in the gateway node, a nonce value, generating, with the processor in the gateway node, an encrypted version of the nonce value using the first shared key, transmitting, with the transceiver in the gateway node, the encrypted version of the nonce value to the first node, receiving, with the transceiver in the gateway node, a transformed nonce value from the first node, the transformed nonce corresponding to a predetermined numeric transformation applied to the nonce value by the first node after the first node decrypts the encrypted version of the nonce using the first shared key, and authenticating, with the processor in the gateway node, the first node in response to the transformed nonce value received from the first node matching another transformed nonce value generated by the processor in the gateway node applying the predetermined numeric transformation to the nonce value generated by the random number generator in the gateway node.

In a further embodiment, the processor in the gateway node increments the nonce value generated by the random number generator in the gateway node by a predetermined value to match the transformed nonce value received from the first node.

In a further embodiment, the receiving of the transformed nonce value includes receiving, with the transceiver in the gateway node, a transformed nonce value from the first node through a Controller Area Network bus shared communication medium.

DETAILED DESCRIPTION

Figure 1:
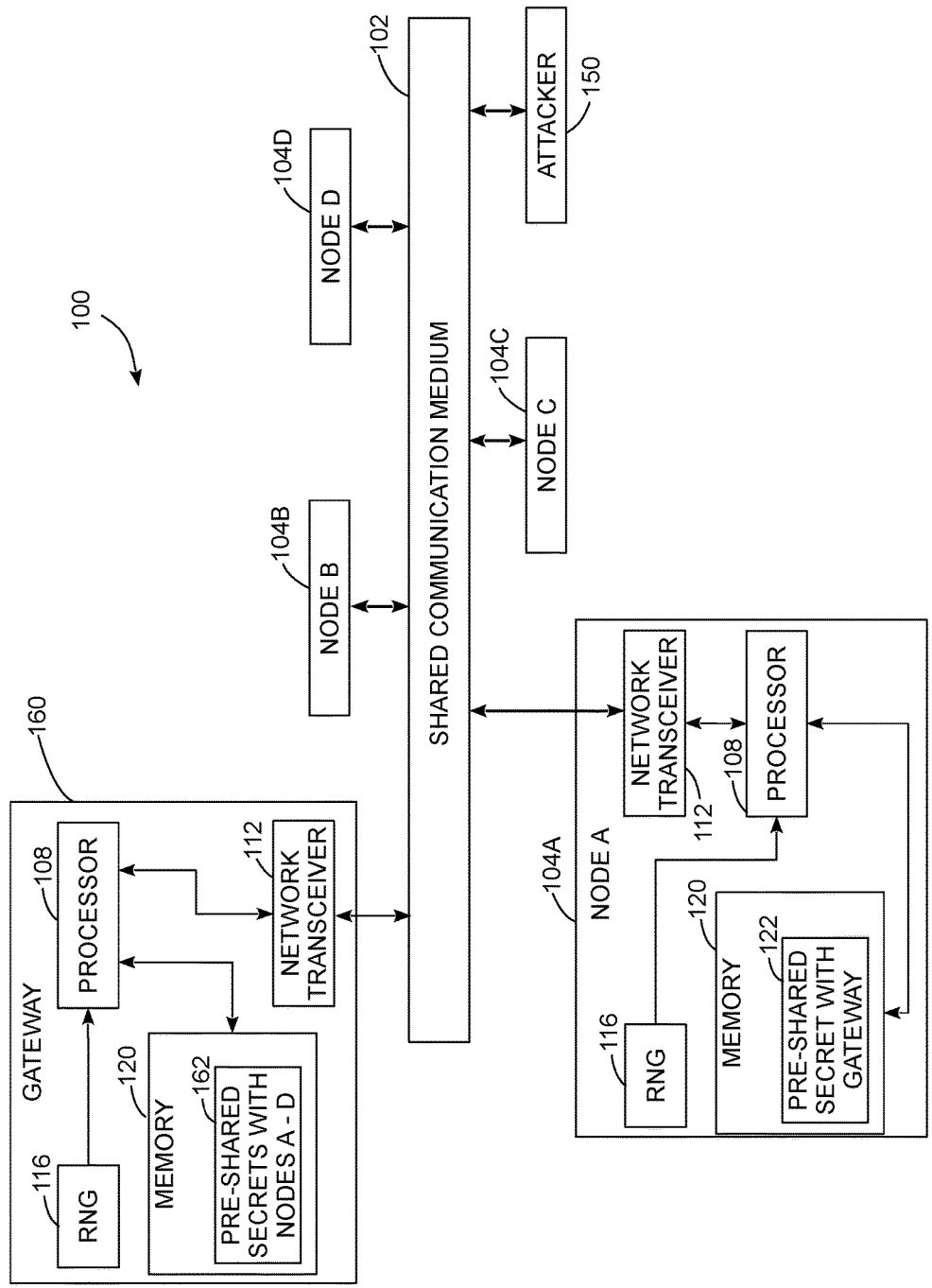
FIG. 1 is a schematic diagram of a network communication system in which a plurality of nodes communicate using a shared communication medium that is also connected to an attacker.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bit" refers to a binary value that can have one of two discrete values, which are typically represented as a "0" or "1" in text. Communication systems generate signals with different voltage levels, phases, or other signal characteristics that represent the two values of a binary bit during transmission of data. As is well-known to the art, digital data includes a series of one or more bits that can represent numbers, letters, or any other form of data and, in particular, a set of bits can form a cryptographic key. As used herein, the terms "logical complement" or "inverse" as applied to binary values are interchangeable and refer to a set of data or an operation that changes the values of each bit of binary data (e.g. the binary sequence "101" is the logical complement of "010"). As described in more detail below, a protocol for secure key exchange leaves different nodes with sets of corresponding bits for shared keys that are logical complements of each other. Selected sets of the nodes perform an inversion operation so that all of the nodes have the same shared key.

As used herein, the term "key" or "cryptographic key" refers to a sequence of bits that two or more nodes in a communication network use to perform cryptographic operations including the encryption and decryption of data and for authentication of transmitted data. A "shared key" refers to a key that is known to two or more nodes that communicate with each other but the shared key is not otherwise known to third parties, including attackers. The methods and systems described herein enable two or more nodes in a communication network to generate a shared key that an attacker cannot identify even if the attacker can monitor any communication that occurs between the nodes. After the shared keys are generated, the nodes perform cryptographic operations that are otherwise well-known to the art and are not described in greater detail herein.

As used herein, the term "shared communication medium" refers to a physical network connection and network communication protocol in which multiple nodes transmit and receive data in a manner where any transmission from a single node is received by all other nodes that are connected to the shared communication medium. In a shared communication medium, two nodes can transmit data simultaneously. In the prior art, simultaneous transmission is considered a disadvantage to a shared communication medium because two simultaneous signals can produce a "collision" that prevents receivers from understand two different messages from two different transmitting nodes. However, the simultaneous transmission property is useful in the systems and methods described herein. The shared communication medium is considered an "insecure" or "untrusted" communication channel because an attacker is assumed to have the ability to monitor any and all communications that occur through the shared communication medium.

Two non-limiting examples of shared communication media include the Controller Area Network bus (CANbus) network communication bus and protocol and a shared Ethernet medium that uses a hub, and not a network switch, to broadcast signals. In both of these embodiments, all nodes that are communicatively connected to the shared communication medium can observe all signals that are transmitted through the communication medium, including signals that are not intended for receipt by a particular node. As described in more detail below, each node is a computing device that includes a transceiver configured to both transmit and receive signals through the shared communication medium to one or more additional nodes.

FIG. 1 depicts a network communication system 100 that includes a plurality of communication nodes 104A, 104B, 104C, and 104D, a gateway node 160, and an attacker 150. The nodes 104A-104D, gateway node 160, and attacker 150 are each communicatively connected to a shared communication medium 102. The shared communication medium 102 is, for example, a CANbus connection and the shared communication medium is also referred to as a "bus" in the description below. Each of the nodes 104A-104D and the gateway node 160 is a computing device that is configured to perform the methods described herein for performing secure key generation in the presence of an attacker 150. The attacker 150 is another electronic device that can detect any and all communications between the nodes 104A-104D and the gateway node 160 through the shared communication medium 102. Additionally, the attacker 150 can transmit signals through the shared communication medium 102 to impersonate one of the actual nodes 104A-104D. In some situations, the attacker 150 is a legitimate node in the network that has been compromised by an adversary. In the system 100, the nodes 104A-104D generate a shared secret key via communications through the shared communication medium with assistance from the gateway node 160. The communications are assumed to be recorded by the attacker 150 and in some circumstances the attacker 150 may attempt to impersonate one of the nodes 104A-104D. However, as described below the attacker 150 cannot determine the shared keys based on observed communications through the shared communication medium 102 and cannot impersonate a legitimate node. After two or more of the nodes 104A-104D have produced a shared secret key, the nodes can use the key for encryption and/or authentication of message traffic that the attacker 150 cannot decrypt or falsify in a practical manner.

In the system 100, each FIG. 1 depicts node 104A (node A) in more detail, but each of the nodes 104B-104D includes a similar configuration. The node 104A includes a processor 108, network transceiver 112, random number generator (RNG) 116, and memory 120. The processor 108 is, for example, a digital microprocessor, microcontroller, application specific integrated circuit (ASIC), field programmable gate array (FPGA), or any other suitable digital logic device that controls the function of the node 104A. The processor 108 is operatively connected to the network transceiver 112, RNG 116, and memory 120. In some embodiments, one or more of the components in the node 104A are combined in a system on a chip (SoC) configuration.

The network transceiver 112 is a communication device that transmits electrical signals corresponding to one or more bits of data received from the processor 108 through the bus 102 and receives signals corresponding to binary data bits that the other nodes 104B-104D transmit through the bus 102. For example, in a CANbus configuration, the network transceiver 112 transmits data as a sequence of voltage signals at two different voltage levels to signify either a logical "0" or "1" for bits of binary data. In the CANbus protocol a logical "0" has a high voltage level while a logical "1" has a low voltage level, although this convention may be reversed in other communication network embodiments. The network transceiver 112 is also configured to receive a signal from the shared communication medium 102 during a simultaneous transmission through the shared communication medium 102. In prior-art communication systems the transceiver 112 receives signals from the bus 102 during transmission to detect a potential collision that occurs when another one of the nodes 104B-104D transmits concurrently to the operation of the node 104A. As described in more detail below, in the system 100 the transceiver 112 detects transmissions from another node that occur simultaneously with the transmission of data from the node 104A as part of a process for shared key generation.

In the node 104A, the RNG 116 is a hardware device or software module that produces random number data where a portion of the random number data forms the basis of shared cryptographic keys between the node 104A and one or more of the other nodes in the system 100. For the purposes of the system 100, a suitable implementation of the RNG 116 produces random numbers that the attacker 150 cannot predict with a likelihood that is statistically greater than pure chance even if the attacker 150 is assumed to have knowledge of a history of at least some of the previously generated random numbers from the RNG 116. Embodiments of such RNGs include "true" random number generators that produce non-repeatable random numbers from one or more entropy sources and deterministic cryptographically secure pseudo-random number generators (CSPRNGs) that produce random numbers in a deterministic manner but one that cannot be easily predicted by an attacker given a history of previously generated random numbers. While the RNG 116 is shown as a separate unit for illustrative purposes, in many embodiments the RNG 116 is implemented as a hardware component in the processor 108 or as a piece of software that the processor 108 executes to generate the random number data.

The memory 120 includes one or more digital data storage devices including non-volatile memory devices such as magnetic or optical disks and solid state storage devices in addition to volatile memory such as random access memory (RAM). The memory 120 stores programmed instructions for execution by the processor 108 to perform the processes described herein and to perform other functions of the node 104A. The processor 108 also stores data in the memory 120 including random number data from the RNG 116 and shared key data for use in encryption, decryption, and authentication of communication data from the other nodes in the system 100. The memory 120 also stores predetermined shared secret data 122, which is also referred to as $K_n$ for the given node identifier n. The predetermined shared secret data 122 includes a set of bits that are stored in the memory 120 and stored in a corresponding memory of the gateway node 160. The predetermined shared secret data are, for example, a random set of bits that are at least as large as the expected size of shared cryptographic keys used in the system 100 (e.g. at least 128 bits) although the shared secret data may be larger than the shared key size in some embodiments. The shared secret data are stored in the memories of the nodes 104A-104D and the memory of the gateway node 160 one time in an offline manner, such as at the time of manufacture of the system 100 or during an offline maintenance procedure. Each of the nodes 104A-104D shares a different secret with the gateway node 160 and each node does not have access to the predetermined shared secret data of any other node. Thus, the gateway node 160 has access to all of the predetermined shared secret data for the nodes 104A-104D, but the nodes 104A-104D themselves only have access to their individual predetermined shared secret.

In the system 100, the gateway node 160 is another node that is communicatively connected to the shared communication medium 102. For illustrative purposes, FIG. 1 depicts the gateway node 160 with similar computing components to the other nodes including a processor 108, network transceiver 112, RNG 116, and memory 120. In the system 100, the memory 120 in the gateway node 160 stores the predetermined shared secret data 162 from each of the nodes that are connected to the shared communication medium 102, such as the nodes 104A-104D of FIG. 1. The gateway node 160 is referred to as a trusted computing device, which is to say that the integrity of the system 100 relies upon the correct operation of the gateway and assumes that the gateway node 160 has not been compromised by an attacker. In contrast, the nodes 104A-104D are not trusted and the system 100 may operate with at least partial functionality if one of the nodes 104A-104D is compromised. In some embodiments, the gateway node 160 is configured with additional hardware and software components that make compromising the gateway node 160 more difficult, while such hardware and software components would be impractical for use with the other nodes 104A-104D. In some embodiments, the gateway node 160 is further connected to other gateway computing devices as is depicted in more detail in FIG. 8.

Figure 2:
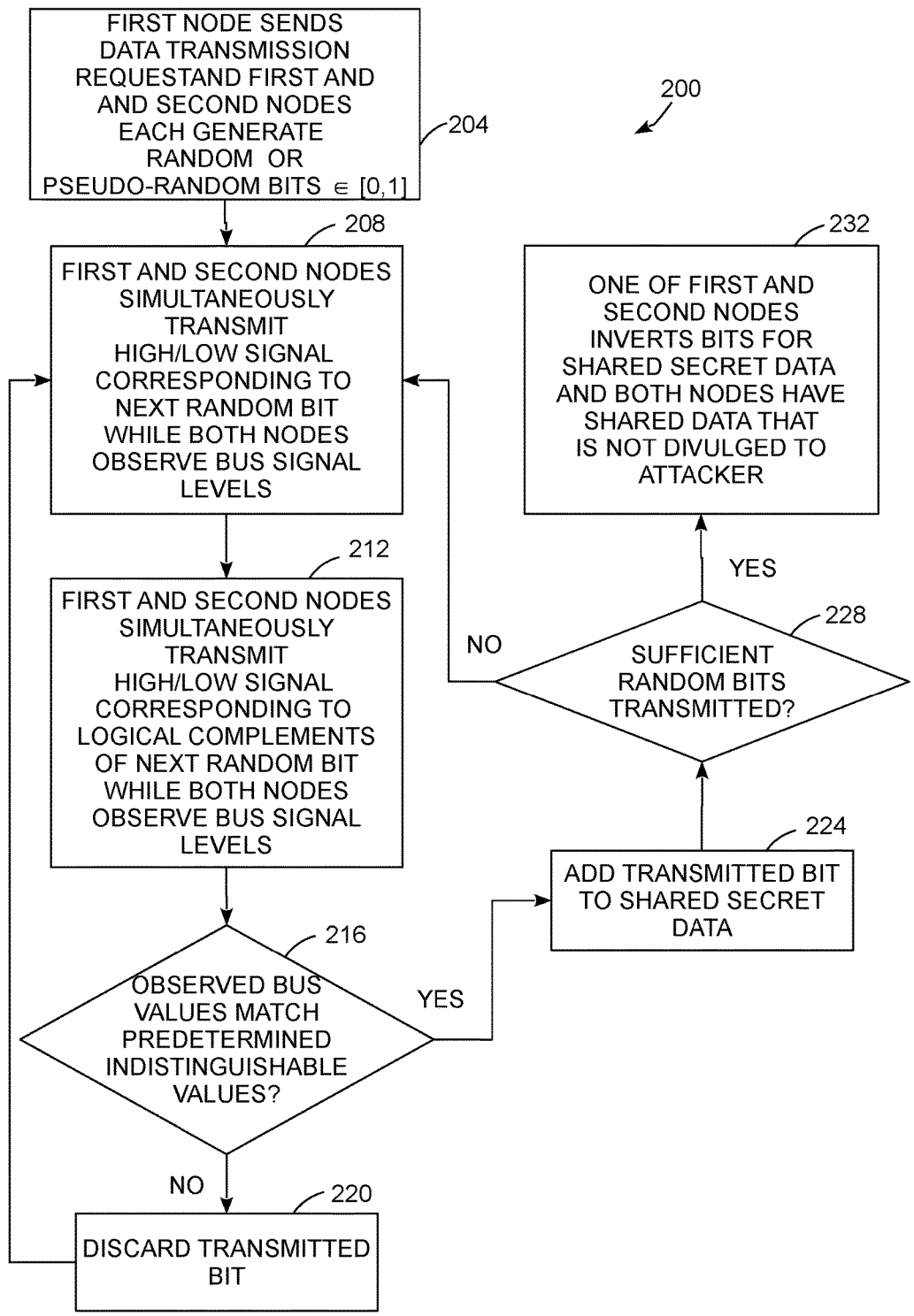
FIG. 2 is a block diagram of a process for performing shared key generation between two nodes that communicate using a shared communication medium.

FIG. 2 depicts a process 200 for the exchange of shared bits of data between two nodes that only communicate with each other using a shared communication medium without revealing the shared data bits to the attacker that monitors the shared communication medium. In particular, the process 200 enables two nodes that are connected to the shared communication medium to produce shared keys or exchange other pieces of random or pseudo-random data without divulging the data to an attacker who monitors the shared communication medium. The process 200 is used as part of the authenticated shared key generation processes that are described in further detail herein. In the discussion below, a reference to the process 200 performing a function or action refers to the operation of one or more processors to execute stored program instructions to perform the function or action in conjunction with other components in a node and a communication system. The process 200 is described in conjunction with the system 100 of FIG. 1 for illustrative purposes.

Process 200 begins as the first node transmits a request to generate a new shared key to the second node and both the first and second nodes generate random bits (block 204). For example, in the system 100 the node 104A is the first node and the node 104B is the second node in one embodiment. The node 104A transmits a request to generate a new shared key to the node 104B. The attacker 150 receives the request and therefore can monitor specific communications that occur through the shared communication medium 102 as the nodes 104A and 104B generate the shared key. The request optionally includes a number of bits that specifies the length of the shared key (e.g. 64 bits, 128 bits, etc.). In one embodiment, each of the nodes 104A and 104B generates a number of random bits that corresponds to twice the length of the key, such as generating 256 bits of random data for a 128-bit key size. In other embodiments that are described in more detail below, the nodes generate bits of pseudo-random data that appear to be random to the attacker 150 but that are produced using a one-way function and other operations that enable the gateway node 160 to monitor the transmissions from different nodes in the system 100 to authenticate the transmissions from different nodes. In other embodiments, the two nodes 104A and 104B generate a larger or smaller set of random data and regenerate additional random data as needed during the process 200.

As is described below, because some bits of data "leak" to the adversary 150 during transmission in a random manner, the process 200 performs a varying number of transmissions to exchange the random or pseudo-random data between nodes. On average, to transmit a particular number of N bits that the attacker cannot identify based on observing the shared communication medium, the nodes perform 2N transmissions. Statistically, half of the transmissions are "valid" transmissions where the attacker cannot identify the transmitted bits from the communication and the other half of the transmissions are "invalid" transmissions that "leak" the information to the attacker 150 and to any other node connected to the shared communication medium 102. Of course, in some situations the nodes need to generate more than 2N bits of random or pseudo-random data to successfully transmit the N valid bits in a manner that cannot be observed by an eavesdropper. The two nodes that perform the process 200 discard the invalid leaked bits for secret communications since the attacker 150 identifies the leaked information. As presented below, however, even the "leaked" bits can be useful to select operations of the system 100 in situations where the attacker 150 can identify the leaked bits but does not gain an advantage in attacking the system 100 from merely having possession of this information.

Process 200 continues as the first node 104A and second node 104B simultaneously transmit signals at high or low electrical voltage levels corresponding to a next random bit in the generated random data while both nodes observe the signal levels on the shared communication medium 102 (block 208). Using CANbus as an example, a high voltage level signal corresponds to a logical bit value of "0" while a low voltage level signal corresponds to a logical bit value of "1". The transceivers 112 in both nodes 104A and 104B transmit signals at the appropriate voltage level for the corresponding random data values for the next bit in each of the nodes simultaneously. Additionally, the transceivers 112 receive the combined signal on the shared communication medium 102 during the transmission process to enable the nodes 104A and 104B to observe the signal level of the shared communication medium 102 during the transmission. As mentioned above, the combined signal includes a high or low voltage output depending upon the voltage level of the transmitted signals from the nodes 104A and 104B. If either node transmits a high-voltage signal then the high voltage signal dominates the observed signal on the shared communication medium 102. As discussed in more detail below, in situations where one node transmits a logical "1" while the other node simultaneously transmits a logical "0", the attacker 150 cannot determine which node is transmitting the signal for each logical bit value, and the attacker 150 cannot distinguish between different pairs of logical 1/0 or 0/1 signals from the nodes 104A and 104B, respectively.

Figure 7:
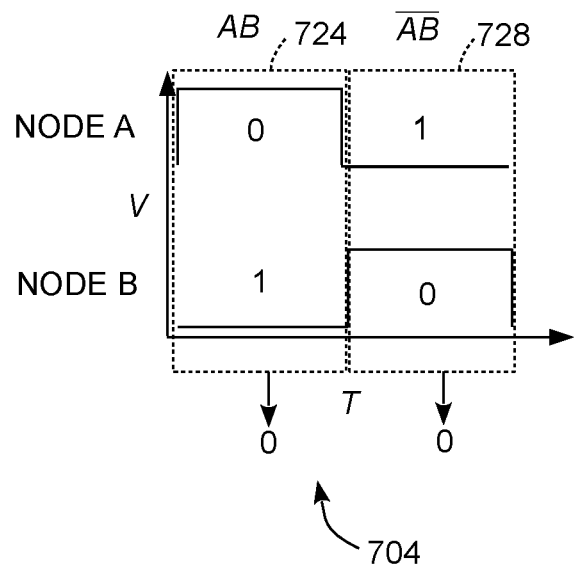
FIG. 7 is a diagram depicting signal levels for two different communications between two nodes using the shared communication medium that are indistinguishable to an attacker.
Figure 7:
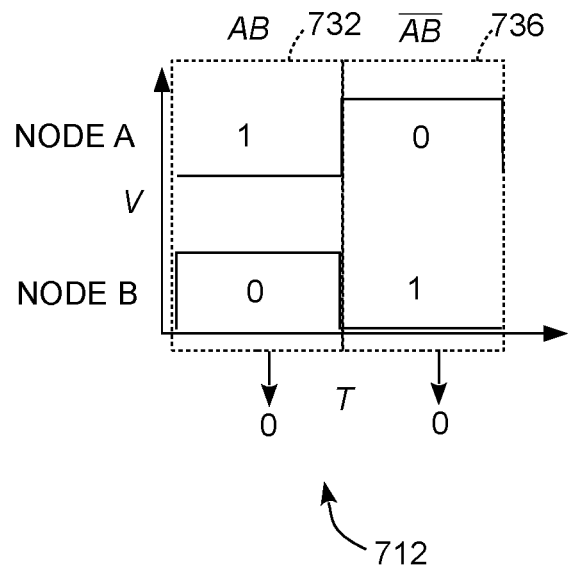

Process 200 continues as the first node 104A and second node 104B simultaneously transmit signals at high or low electrical voltage levels corresponding to the logical complements of the next random bit in the generated random data while both nodes observe the signal levels on the shared communication medium 102 (block 212). Using node 104A as an example, the processor 108 generates the logical complement of the randomly generated bit value and operates the transceiver 112 to transmit the logical complement of the bit simultaneously with the transceiver in the node 104B. The transceivers in both nodes receive the combined signal on the bus 102 to observe the state of the shared communication medium while the logical complements of the randomly selected bits are transmitted. FIG. 7 depicts the transmission levels for the transmission of random bits and logical complements of the random bits. In the graph 704, nodes A and B first transmit signals at different voltage levels corresponding to bits 0 and 1 (reference 724), respectively, followed by the logical complement bits 1 and 0 (reference 728), respectively. In the graph 712, the nodes A and B first transmit bits 1 and 0 (reference 732), respectively, followed by the logical complement bits 0 and 1 (reference 736), respectively. The graphs 704 and 712 correspond to the CANbus specification in which a logical "0" corresponds to a high voltage signal while the logical "1" is a low voltage signal. While FIG. 2 depicts the transmission and observation of the random bits from the nodes 104A and 104B prior to the transmission of the logical complements of the random bits, the transmissions of the random bits and the logical complements of the random bits can occur in any predetermined order given that both nodes 104A and 104B transmit the corresponding sets of random bits or the logical complements of the random bits simultaneously.

The process 200 continues as the processors in the nodes 104A and 104B determine if the signal level values that are observed on the shared communication medium 102 during the transmissions of the random bit values and the logical complements of the random bit values correspond to predetermined values that indicate valid bits that can be added to the shared secret key (block 216). The nodes 104A and 104B only add a bit to the shared secret key in response to the observed values being indistinguishable from another set of values for a different set of bits, meaning that the attacker 150 cannot identify the bits that the nodes 104A and 104B transmitted. Table 1 provides an illustrative example of the indistinguishable signal combinations for the signals from nodes A and B along with the logical complement signals $\overline{A}$ and $\overline{B}$.

TABLE 1

Observed bus values for random bits

| Next Random Bit | | Shared Communication Medium Observation | | VALID/DISCARD? |
|---|---|---|---|---|
| NODE A | NODE B | A & B | $\overline{A}$ & $\overline{B}$ | |
| 0 | 0 | 0 | 1 | DISCARD |
| 0 | 1 | 0 | 0 | VALID |
| 1 | 0 | 0 | 0 | VALID |
| 1 | 1 | 1 | 0 | DISCARD |

In Table 1, the observed values on the shared communication medium 102 for value combinations of 1 and 0 or 0 and 1 for the nodes 104A and 104B produce an output on the shared communication medium 102 that is indistinguishable to the attacker 150. These rows are labeled "valid" because the randomly generated bits can be used as part of a shared secret key without divulging the content of the secret key to the attacker 150. More particularly, the observed value on the bus 102 for the combined signals from the nodes 104A and 104B for the random bit values is 0 for either combination and the observed value for the logical complement is also zero. Another property of table 1 is that the observed signal levels on the bus correspond to the same logic value during the transmission of the signals corresponding to the random bits from the nodes 104A and 104B and during the transmission of the signals corresponding to the logical complements of the random bits. The other two entries in the table 1, however, show different bus signal levels during transmission of the signals for the random bit values and for the logical complements of the random bit values. The attacker 150 is assumed to have access to the logic table 1 and identifies the bit combinations in the "discard" rows based on the different values for the transmission of the randomly generated bits and the logical complements of the randomly generated bits. The two entries in Table 1 are indistinguishable from one another from the perspective of the attacker 150, although the nodes 104A and 104B can distinguish between them because the nodes each generated a random bit value that is not known to the attacker 150.

If the processor 108 in each node identifies that the values are not indistinguishable, then both nodes discard the randomly generated bits and do not use the bits as part of the shared secret key (block 220). In particular, if the received signal levels from the shared communication medium 102 indicate different levels between the bits (AB) and the logical complements of the bits ($\overline{AB}$) then the attacker 150 can distinguish the signals and identify the randomly generated bits for the nodes 104A and 104B. The discarded bits are known to the attacker 150, but since the nodes do not include the discarded bits in the shared secret data transmission, the information does not assist the attacker 150. As noted above, the RNGs 116 in the nodes are either true random number generators or generate pseudo-random data generators using, for example, a cryptographically secure one-way function that does not enable the attacker 150 to identify subsequent random numbers based on previously observed random numbers, so the knowledge of the discarded bit values does not assist the attacker 150 in identifying subsequent random values. Thus, the process 108 stores the next randomly generated bit value in the memory 120 as part of the key only in response to the first signal level received through the shared communication medium 102 for the randomly generated bits and the second signal level received through the shared communication medium 102 for the logical complements of the random bits being the same. If the processor 108 in each node identifies that the values are indistinguishable, then both nodes use the valid randomly generated bits as part of the shared secret communication (block 224). In one embodiment, the processor in each node appends the next random bit to the shared secret data.

The process 200 continues until a sufficient number of random or pseudo-random bits have been transmitted successfully for the communication (block 228). Of course, the number of bits required for different types of communication varies, and the two nodes 104A and 104B optionally transmit a predetermined number of bits that may be greater than the number of transmissions required to transfer the data to enable the gateway node 160 to monitor and authenticate the communication between the nodes 104 A and 104B.

During process 200, one of the first and second nodes inverts the bits of the shared secret data to provide both nodes with the same secret data and the nodes subsequently use the shared secret data for the generation of shared keys or subsequent transmissions to other nodes in the system 100 (block 232). For example, in one configuration the node 104B generates the logical complement of the shared key stored in the memory of the node 104B to match the bits of the shared key stored in the memory of the node 104A. One of the nodes inverts the bits of the key because, as presented above in Table 1, every successful transmission of random data occurs when the two nodes produce a random combination of a logical "1" and "0" values but combinations of two logical "0" or logical "1" values are always discarded. Thus, one of the nodes inverts the bits of the shared key to ensure that both nodes are using the same shared key.

The process 200 described above enables the nodes 104A and 104B to communicate the "valid" bits between each other even in the presence of the attacker 150 for at least two reasons. First, the nodes 104A and 104B each have a piece of information that is unavailable to the attacker 150, which is the internally generated random or pseudo-random value for each node. Second, the nodes 104A and 104B transmit the signals to each other simultaneously, so the attacker 150 can observe the combined output of both nodes for valid bits, but cannot identify the individual node that transmitted each portion of the combined signals. FIG. 7 depicts the individual and combined signals for two different combinations of bits. In combination 704, node A (104A) transmits a logical "0" that has a high voltage signal level in the CANbus standard. Node B (104B) simultaneously transmits the logical "1" at the low voltage level. The combination of the high-voltage signal and low voltage signal is still a high voltage signal ("0") which both nodes A and B observe, along with the attacker 150. During the transmission of complementary signals, $\overline{AB}$, node A transmits the low voltage signal for logical "1" and node B transmits the high-voltage signal for logical "0". If the situation is reversed and node A generates a logical "1" and node B generates a logical "0", then the transceivers in the nodes transmit the combined output signals 712 depicted in FIG. 7 that are identical to the combined signals 704, and the attacker 150 cannot distinguish between the two different sets of random data for the two nodes. The attacker cannot use the transmissions of AB or $\overline{AB}$ to identify the underlying random data bits because for the combination of "0" and "1" from either node the transmissions always produce the indistinguishable combined output of a high-voltage (logical "0") output.

In particular, the two nodes identify valid bits that can be added to the shared secret data when the random values that both nodes transmit on the bus produce an observable signal that is indistinguishable from another observable signal on the bus corresponding to a different combination of random bits. As depicted above in Table 1, when nodes 104A and 104B produce two different random bits (either 1 for Node 104A and 0 for Node 104B or vice versa) the observed output on the bus 102 remains a logical "0" for both the regular bits (A & B) and the logical complement of the bits ($\overline{A}$ & $\overline{B}$). Thus, these two random bit sequences are indistinguishable to the attacker 150, which only observes "0" on the bus 102, but the two nodes 104A and 104B can distinguish between the different sets of bits because both nodes also have the private information of the randomly generated bit. However, the rows of table 1 that are labeled "DISCARD" correspond to random bit sequences where the attacker 150 observes different sets of data on the bus 102 for A & B and $\overline{A}$ & $\overline{B}$, and can deduce the bit data that each node generated. The "discarded" bits are not stored with secret data that may be used to generate secret keys or for any other purpose that is hidden from the attacker 150. As described in more detail below, however, other nodes in the system 100 receive and store the "discarded" or "leaked" bits are stored in memory 120 for additional authentication operations within the system 100. For example, in one embodiment of the system 100 the node 104C observes and stores the discarded bits in a communication between nodes 104A and 104B. The node 104C then uses the leaked or discarded bits as part of a pseudo-random number generation process during a subsequent set of communications with the node 104B using the process 200.

Of course, the nodes 104A and 104B have no prior knowledge of the random data stored in the other node prior to transmission on the bus 102, so the nodes simply discard transmission results that leak information about the random bit values to the attacker 150 after the transmission occurs. During process 200 the nodes 104A and 104B that participate in the shared key generation process 200 generate the key based both on the known state of the randomly generated numeric values, which is a secret that is known only to each of the nodes and is not known to the attacker 150, in combination with the observed signal that is formed by the simultaneous transmissions from both nodes 104A and 104B. The attacker 150 also receives the combined signal from the nodes 104A and 104B, but has no ability to distinguish the particular signals that either of the individual nodes transmitted since there is an equal probability that node 104A transmitted the logical "1" while node 104B transmitted the logical "0" or vice versa.

While process 200 is described above for generation of a shared key between two nodes, the techniques of the process 200 can be extended to enabling shared key generation between more than two nodes as is set forth below. As depicted in FIG. 1, some system configurations include more than two nodes and the nodes in the system 100 of FIG. 1 also produce shared keys for sets that include three or more nodes in a secure manner.

Figure 3:
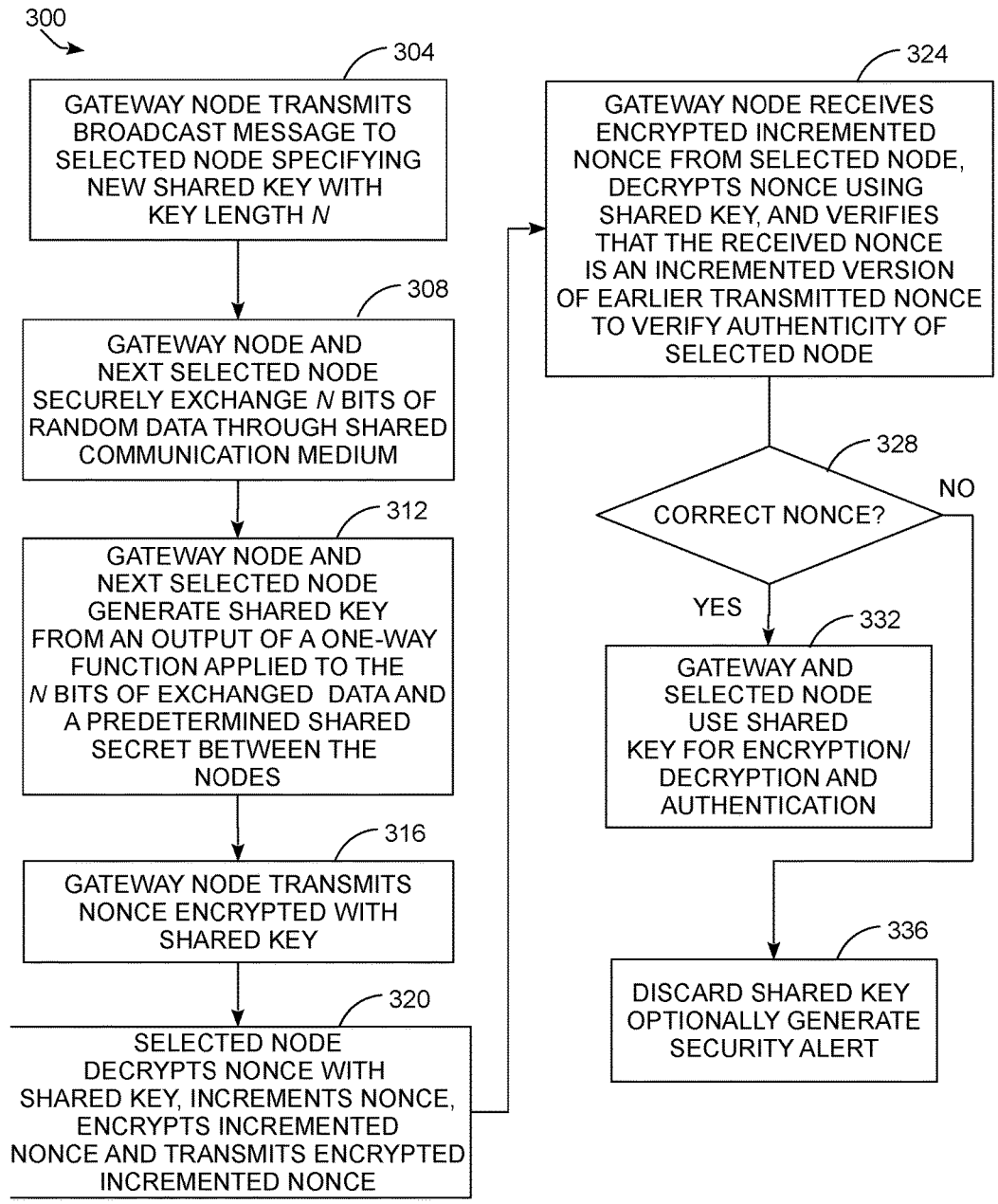
FIG. 3 is a block diagram of a process for authenticated shared key generation between a gateway node and another node in a network that communicate using a shared communication medium.

FIG. 3 depicts a process 300 for generating an authenticated shared key between a gateway node and another node in a network, such as in the system 100. The process 300 may be repeated between the gateway and two or more nodes in the system 100 to provide shared secret keys between the gateway node 160 and multiple nodes in the system 100. In the discussion below, a reference to the process 300 performing a function or action refers to the operation of one or more processors to execute stored program instructions to perform the function or action in conjunction with other components in a node and a communication system. The process 300 is described in conjunction with the system 100 of FIG. 1 for illustrative purposes.

Process 300 begins as the gateway node 160 transmits a broadcast message to selected nodes, such as the node 104A in the system 100, specifying a shared key generation process with the selected node (block 304). The gateway node optionally specifies the length of the shared key (e.g. 64 bits, 128 bits, etc.) in the broadcast message. Each of the nodes 104A-104D and the attacker 150 is configured to observe the broadcast message.

The process 300 continues as the gateway node 160 and the selected node 104A securely exchange N bits of random data through the shared communication medium 102 (block 308). For example, the gateway node 160 and the selected node 104A perform the process 200 described above to exchange N bits of random data through the insecure communication medium 102. In the illustrative example of FIG. 3, the N bits of exchanged data match the length of a shared secret key that the process 300 produces between the gateway node 160 and the node 104A, but in alternative embodiments the N bits may be less than the key length, which reduces cryptographic security but reduces the requirements to transmit random bits, or greater than the key length, which increases cryptographic security but increases the transmission requirements. Those of skill in the art will recognize that during the secure communication phase, some attackers 150 may impersonate the legitimate node 104A. The attacker 150 can perform the same process 200 with the gateway node 160 and to exchange shared secret data in the same manner as any of the legitimate nodes 104A-104D. However, as is described in more detail below, the process 300 enables the gateway to determine if the node that exchanges the random data with the gateway node 160 is the legitimate node 104A or another node, such as the attacker 150.

Process 300 continues as the gateway node 160 and the selected node 104A generate a shared secret key using a one-way function that uses the predetermined shared secret data 122 ($K_A$) and the N bits of exchanged data as inputs (block 312). The processor 108 in the node 104A and the corresponding processor in the gateway node 160 perform the one-way function to generate the shared key $K_{GA}$. Mathematically, the generation of the shared key $K_{GA}$ is expressed as: $K_{GA} \leftarrow f(N, K_A)$ where $K_A$ is the predetermined shared secret data between the gateway node 160 and node 104A, and N is the random bits that were transmitted during process 300. The one-way function $f$ is a cryptographically secure one-way function, such as a member of the secure hash algorithm (SHA) family of hash functions, which produces an output key that the attacker 150 cannot use to identify $K_A$ or N even if the attacker 150 were to be provided with the shared key $K_{GA}$. The one-way function $f$ accepts the random data N and the shared secret $K_A$ as, for example, a concatenated set of bits in any predetermined order (N∥$K_A$ or $K_A$∥N) or as a predetermined combination such as an exclusive-or (XOR) combination of $K_A \oplus N$. During each execution of the process 300, the two nodes 160 and 104A exchange a different set of random bits N, so the shared key that is generated between the two nodes changes during each invocation of the process 300. The process 300 and other key generation processes described herein provide what is referred to as perfect forward secrecy (PFS) because even if the attacker 150 obtains the random data N and the shared key $K_{GA}$, the attacker 150 cannot use this information to identify previous sets of shared key that the nodes 160 and 104A generated during previous invocations of the process 300.

The process 300 continues as the gateway node 160 performs an authentication process to ensure that the node 104A, and not an impostor, was responsible for generating the shared key $K_{GA}$. If the node 104A, which knows the shared secret 122 $K_A$, actually participated in the shared key generation process, then both the node 104A and the gateway node 160 have the same key $K_{GA}$. If, however, the attacker 150 participated in the process 300, then the attacker 150 cannot regenerate the same shared key $K_{GA}$, and the system 100 performs the remaining portions of the process 300 to verify whether or not both parties have the matching key $K_{GA}$. The gateway 116 first generates and transmits a random nonce (number-only-once) value that is encrypted with the shared key $K_{GA}$ (block 316). The nonce value is, for example, a randomly generated value that the RNG in the gateway node 160 generates having a sufficient number of bits to make the likelihood of repeating the nonce value be negligible (e.g. the nonce could have N bits and the same length as the shared key $K_{GA}$, although the lengths may be different).

The process 300 continues as the node that generated the shared key with the gateway node 160 receives and decrypts the nonce, increments the nonce, encrypts the incremented nonce with the shared key $K_{GA}$, and transmits the incremented encrypted nonce to the gateway node 160 (block 320). In the system 100, the processor 108 in the node 104A that generates the same shared key $K_{GA}$ can decrypt the correct version of the nonce, increment the nonce by simply adding 1 or another predetermined value to the nonce, and then encrypt the incremented nonce using the correct key $K_{GA}$. While the node 104A increments the nonce in the illustrative example of FIG. 3, in alternative embodiments, the node 104A applies any predetermined numeric transformation to the nonce value that the gateway 160 can reproduce after the node 104A transmits an encrypted version of the transformed nonce value to the gateway 160. For example, decrementing the nonce, applying a known XOR'd value to the nonce such as a numeric hardware address of the node 104A, or any other suitable repeatable numeric transformation can used with the process 300. The attacker 150, however, cannot decrypt the correct value of the nonce or encrypt the transformed nonce value properly because the attacker 150 does not have the same shared key $K_{GA}$ as the gateway node 160.

The process 300 continues as the gateway node 160 receives the encrypted and incremented nonce, decrypts the received nonce using the shared key, and the processor in the gateway node 160 verifies that the decrypted nonce is an incremented version of the original nonce that the gateway node 160 transmitted (block 324). In an alternative embodiment of the process 300, the first node 104A does not re-encrypt the transformed nonce value. Instead, the first node 104A decrypts the nonce using the shared key, transforms (e.g. increments) the nonce and then retransmits the transformed nonce value to the gateway 160 without additional encryption. The actual bit values of the transformed nonce value do not need to remain secret from the attacker 150 during process 300 since the nonce is not reused during any subsequent executions of the process 300. If the node 104A is an imposter, then the node 104A does not have the same shared key as the gateway 160 and will not be able to generate a properly decrypted version of the nonce value. The gateway 160 can identify a correct transformed nonce value to authenticate the node 104A or an incorrect transformed nonce value to reject the node 104A with or without an additional encryption on the part of the first node 104A.

If the gateway node 160 determines that the transformed nonce received from the node 104A is correct (block 328) then the gateway node 160 authenticates that the node 104A generated the proper shared key $K_{GA}$ and the nodes use the shared key to perform message encryption and decryption and authentication using techniques that are otherwise known to the art (block 332). In one illustrative embodiment, the nodes use an advanced encryption system (AES) encryption system using the shared keys as symmetric keys in a block cipher scheme. If, however, the processor in the gateway node 160 identifies that the nonce received from the selected node is not correct, then the gateway node 160 discards the incorrect shared key $K_{GA}$ and optionally generates a security alert to an external user or computing system indicating the possibility of an attacker in the system 100 (block 336). For example, if the system 100 is incorporated into an automobile the gateway node 160 optionally generates an alert to the owner of the vehicle or uses a wireless data networking transceiver in the vehicle to transmit the alert to a manufacturer or dealer of the vehicle to assist in identifying and eliminating the attacker 150.

As mentioned above, the gateway node 160 optionally performs the process 300 with multiple nodes in the system 100 (e.g. nodes 104A-104C) to generate a set of shared keys that each corresponds to a single node (e.g. $K_{GA}$, $K_{GB}$, $K_{GC}$). The gateway node 160 generates a single shared key for the entire set of nodes, and transmits encrypted versions of the single shared key to each of the nodes using the individual shared keys to produce a different encrypted copy of the shared key for each node (e.g. three encrypted copies where each copy corresponds to one of nodes 104A, 104B, and 104C). In another variation, the gateway node 160 uses one of the shared keys for an individual node (e.g. $K_{GA}$) as the shared key for the entire set and only encrypts and transmits the shared key to the remaining nodes in the set (e.g. only sends the encrypted versions of $K_{GA}$ to nodes 104B and 104C).

Figure 4:
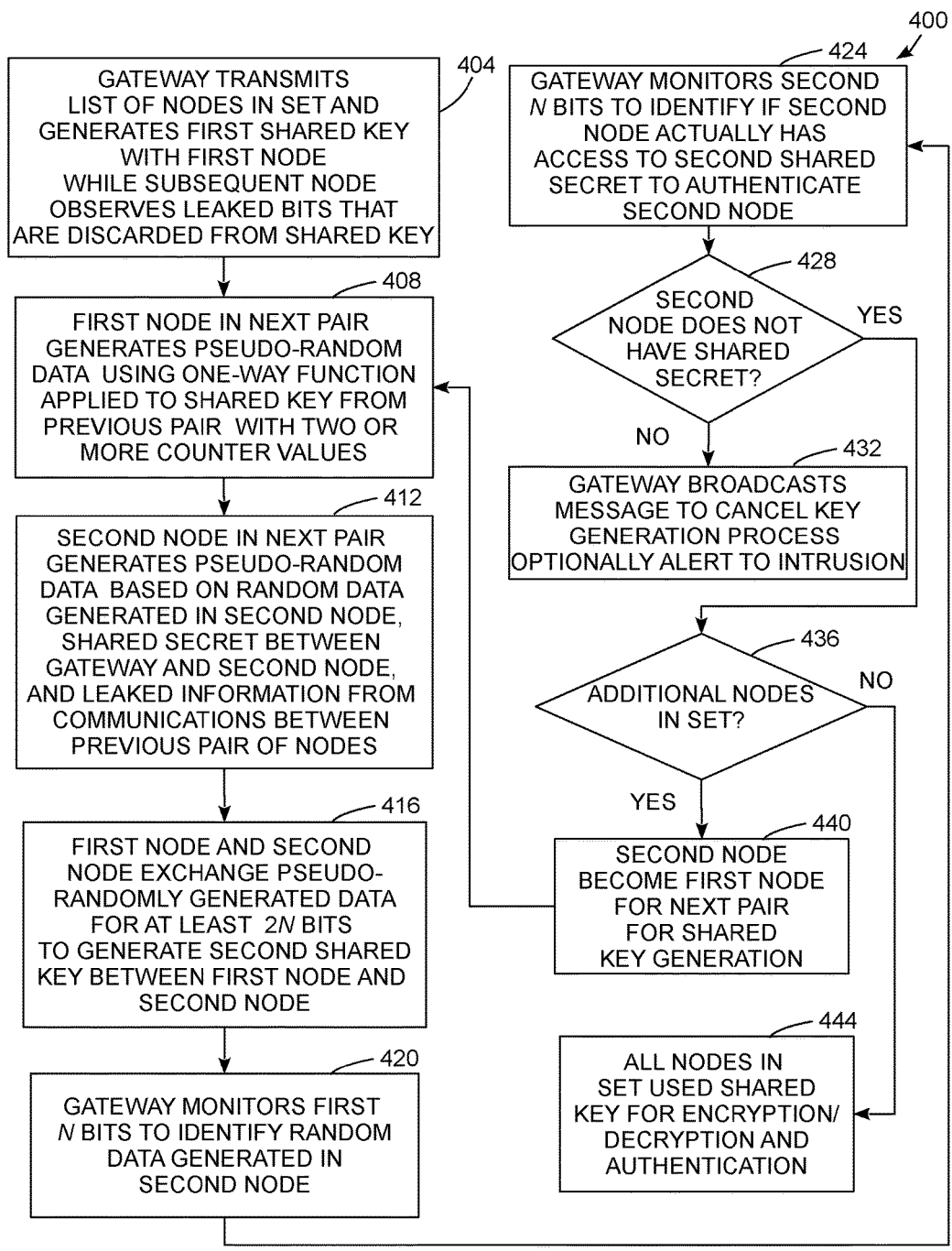
FIG. 4 is a block diagram of a process for process for authenticated shared key generation between a plurality of nodes in a network that communicate using a shared communication medium.

FIG. 4 depicts another embodiment of a process for performing authenticated shared key generation between a set of multiple nodes including sets of more than two nodes. The process 400 only uses the gateway node to generate a single shared key with one other node and the gateway subsequently monitors the operations of the remaining nodes in the set to authenticate that only the correct nodes have generated a shared key. In the discussion below, a reference to the process 400 performing a function or action refers to the operation of one or more processors to execute stored program instructions to perform the function or action in conjunction with other components in a node and a communication system. The process 400 is described in conjunction with the system 100 of FIG. 1 for illustrative purposes.

Process 400 begins as the gateway node 160 transmits a list of nodes in the set and generates first shared key with first node while subsequent node observes leaked bits that are discarded from the shared key (block 404). The gateway node 160 transmits the message identifying the nodes in the set and optionally sets the key length of N bits with a plaintext message that all of the nodes 104A-104D and the attacker 150 receive through the shared communication medium 102. The nodes in the system also perform the process 400 in a predetermined order either based on an order in the message that the gateway node 160 transmits through the shared communication medium 102 or based on, for example, the order of hardware serial numbers or other inherent ordering information. For illustrative purposes, the process 400 is described for a shared key that includes group members 104A-104C but does not include the node 104D and of course does not include the attacker 150. The gateway node 160 establishes the first shared key with node 104A using the process 300 that is described above in FIG. 3. Additionally, during secure transmission process of block 308 of the process 300, the gateway node 160 and node 104A ensure that a minimum of N bits of leaked data are transmitted through the shared communication medium 102 to enable at least one of the other subsequent nodes, such as node 102B to observe the leaked bits. The leaked data are referred to as $y_{leaked}$ herein, and in the illustrative embodiment of FIG. 4 the $y_{leaked}$ data includes N bits of random data that matches the length of the N bit shared keys generated during the process 400. As described above, the gateway node 160 and node 104A discard the leaked bits from use in the shared key $K_{GA}$, but the leaked bits are also random numbers that the node 104A and the node 104B both can store in a memory prior to subsequent communication during the process 400.

Process 400 continues as described below using a pairwise communication process to generate additional shared keys and enable the processor 108 in the gateway node 160 to authenticate that the proper nodes from the set are generating the shared keys. During process 400, each subsequent pair of nodes includes one node from the previous pair along with another node from the set, such as node 104A being the first node since node 104A was in the prior pair (gateway←→104A) with node 104B being the second node for the next pair.

Process 400 continues as the first node in the next pair generates pseudo-random data based on the shared key $K_{(n-1)n}$ where n−1 represents the first node from the previous pair and n is the first node from the current pair, such as $K_{ga}$ from the gateway node 160 and node 104A in the first pair of the process 400 (block 408). In one embodiment, the processor 108 in the first node 104A generates a set of at least 2N pseudo-random bits based on the previous key $K_{ga}$ and a counter value, which can be concatenated to or XOR'd with $K_{ga}$. Assuming that the one-way function $f$ produces N bits of output for each invocation, the processor in the first node applies the one-way function twice for two different counter values i to generate 2N pseudo-random bits: $a_i = f(K_{ga}, i)$ i∈[1, 2]. If additional pseudo-random bits of data become necessary during process 400, the first node merely increments the counter i and applies the same one-way function to generate an addition set of N bits. Those of skill in the art will recognize that the gateway node 160 can easily reproduce the same set of pseudo-random bits since the gateway node 160 has knowledge of the key $K_{ga}$. This relationship also extends through any prior pairs of nodes during subsequent iterations of the process 400. Thus, during process 400, the gateway node 160 has full knowledge of every transmission from the first node in each node pair, even if the observed signals on the shared communication medium 102 are indistinguishable to the attacker 150. Additionally, as described in further detail below, other nodes connected to the shared communication medium 102 receive the transmitted signals that correspond to the leaked bits of data and the leaked data are used as part of a basis for the generation of pseudo-random data for transmission between subsequent pairs of nodes in the process 400.

Process 400 continues as the second node in the pair generates another set of pseudo-random data based on a set of random data generated in the second node, the predetermined shared secret between the second node and the gateway node, and the leaked data that the second node observed from the communications between the prior pair of nodes (block 412). For example, in the system 100 the processor 108 in the node 104B operates the RNG 116 to generate a set of random data b that has a total of N bits to match the length of the shared secret key. The processor 108 in the second node generates a set of 2N pseudo-random bits based on the following operation: $(b \oplus f(K_b, y_{leaked})) \| f(b, K_b)$. The leaked random data $y_{leaked}$ that the second node observes from the previous pair communication process is combined with the shared secret of the second node to produce a first N bits of the pseudo-random output, and the one-way function applied to a combination of the shared secret data of the second node ($K_b$) with the random data b to generate the second set of N pseudo-random bits. In the event that the second node needs to generate additional pseudo-random data during the process 400, the RNG 116 in the second node produces another set of random data (b'), the processor 108 increments the value of $y_{leaked}$, and the second node generates another set of pseudo-random data: $(b' \oplus f(K_b, y_{leaked}+1)) \| f(b', K_b)$.

In the second node, the leaked random data $y_{leaked}$ acts as a randomized salt value that prevent the second node from always generating the same output when applying the one-way function to the predetermined shared secret data ($K_b$ for node 104B). The attacker 150 is assumed to observe the same salt value through the shared communication medium 102, but a proper one-way function such as SHA-256 or another suitable cryptographic hash function prevents knowledge of the salt data from assisting the attacker 150 in identifying $K_b$ or any other secret piece of data. Instead of merely using a random value as the salt, $y_{leaked}$ is used because the gateway node 160 also has a stored copy of $y_{leaked}$ from monitoring the leaked bits of data that are transmitted through the shared communication medium 102 during the previous pair of nodes. In the highly unlikely event that there are no or only a very small number of leaked random data bits from the prior node pairing process, the gateway node 160 or other nodes in the system 100 can restart the process 400. As is described in more detail below, the gateway node 160 can reproduce the pseudo-random data transmitted from the second node during process 400 to authenticate that the second node is the legitimate node in possession of $K_n$ (e.g. $K_b$ for node 104B) and not the impostor 150 in response to identifying that the second node transmits a series of bits that match another set of bits that the gateway node 160 generates during the process 400.

The process 400 continues as the first node and the second node exchange the pseudo-randomly generated data to generate another shared key between the two nodes (e.g. $K_{ab}$ from the first N successfully transmitted bits for nodes 104A and 104B) (block 416). The two nodes in the pair use the process 200 with the pseudo-random data generated in each node to perform the data transmission of the bits that form the new shared key in a secure manner even in the presence of the eavesdropping attacker 150. The two nodes in the pair transmit a minimum of 2N bits of data to enable the gateway node 160 to observe the bits transmitted from the second node 104B and to produce a pool of invalid "leaked" bits for the transceiver in the next node in a subsequent pair to receive the leaked bit transmission signals through the shared communication medium 102. As mentioned above, both the first and second node can produce additional sets of 2N pseudo-random data, if necessary, to transmit the N bits of the shared key successfully.

During the transmission process of block 416, the transceiver in the gateway node 160 receives signals through the shared communication medium 102 to monitor the transmissions between the first node and the second node including both the first N bits of transmitted data and the second N bits. The gateway node 160 identifies the random data b from the second node based on the first set of N bits that the second node transmits (block 420) and then identifies if the second node 104B actually transmits the output of $f(K_b, b)$ during the second set of N transmitted bits (block 424).

Just as with the first node, the gateway node 160 reproduces the bits that are expected to be transmitted from the second node and subsequently observes if the second node actually transmits the expected bytes of data during process 400. The gateway node 160 assumes that the transmissions from the first node are always correct because the first node has already been authenticated during the processing of the previous pair. The gateway node 160 observes any leaked bits from the first and second nodes directly from the signals that the transceiver in the gateway node 160 receives from the shared communication medium 102. For signals that correspond to valid bits where an observer cannot directly determine the transmissions from the two nodes, the processor in the gateway node 160 identifies the bit that is known to be transmitted from the first node, which has already been authenticated, and identifies that the second node transmitted the logical complement of the bit that the processor 108 in the gateway node 160 has already identified for the first node. The Table 1 above depicts the logical conditions in which the combined signals are indistinguishable but the gateway node, which has generated the pseudo-random data transmitted from the first node, can identify the bits transmitted from the second node in response to receiving the indistinguishable signals from the shared communication medium 102 and having access to the bit transmissions from the first node. For example, if the first node transmits a 0 then the second node transmits a 1 and vice-versa.

In particular, the gateway node 160 can reconstruct all of the random data that should be transmitted from the true second node (e.g. node 104B and not the attacker 150) using the following process: 1. The gateway node 160 has full access to the predetermined shared secret $K_b$ and the leaked data $y_{leaked}$, and therefore the processor in the gateway node 160 can regenerate $f(K_b, y_{leaked})$; 2. The transceiver in the gateway node 160 receives the first $N_b$ random bits transmitted from the second node and applies an XOR operation of $f(K_b, y_{leaked}) \oplus N_b$ to recover the random data b that the second node generated (block 420); and 3. The gateway node 160 then generates the second N bits of random data from the second node by applying $f(b, K_b)$ (block 424). If the second node actually transmits the same bits of data that the gateway node 160 reproduces, then the gateway verifies the authenticity of the second node because the bit sequence can only be produced by a node that has access to the predetermined shared secret (e.g. $K_b$ for node 104B). The attacker 150, however, does not have access to this information and cannot reproduce the bit sequence that the gateway node 160 expects from the second node. If the gateway node 160 determines that the second node in the pair does not transmit the correct set of bits that match the bits generated in the gateway node 160 to indicate knowledge of the shared secret (block 428), then the gateway node 160 broadcasts a message to all nodes to cancel the key generation process and discard any shared keys from the process 400 (block 432). The gateway node 160 optionally generates a security alert to an operator of the system 100 or other computing device to indicate that at least one node in the system 100 is an attacker or has otherwise been compromised.

In an alternative embodiment to FIG. 4, the authentication process includes an explicit transmission of bits from the second node to the gateway to enable the gateway to authenticate the second node. For example, in the system 100 the node 104B performs the shared key agreement transmission with the node 104A as described above, but the node 104B also uses the one-way function in association with the random data, such as the random bits b and optionally any additional bits b' required for the transmission process of block 416. The processor 108 in the second node uses the one-way function, the shared secret $K_b$, with the gateway node 160, and the random data to generate: $f(K_b||b||b'||\ldots)$ including any of the random data b, b', etc. that the second node generates. The second node transmits the output of the one-way function to the gateway node 160 as an express message and the gateway node 160, which has observed the random bits b, uses the shared secret $K_b$ to reproduce the output of the one-way function. If the gateway node 160 produces the same output that the second node transmits to the gateway node 160, then the gateway node 160 verifies the authenticity of the second node since the second node used the proper shared secret $K_b$. The gateway node 160 identifies an impostor if the transmitted message does not match the output of the one-way function since the impostor does not have access to $K_b$.

If the processor in the gateway node 160 identifies that the second node in the pair transmitted the expected set of bits that match the set of bits generate within the gateway node 160 (block 428) then the gateway node 160 authenticates the second node 104B and the process continues for any additional nodes in the set that generate the shared key (block 436). The second node from the previous pair becomes the first node in the next pair (block 440) and the processing of blocks 408-440 continues for any additional pairs of nodes in the set of nodes that shares the key. For example, in the system 100 of FIG. 1 node 104B becomes the first node and node 104C becomes the second node in the next pair.

After the final pair of nodes generate a shared key, all of the nodes in the set use the shared key to perform message encryption and decryption and authentication using techniques that are otherwise known to the art (block 444). In the system 100, all prior nodes in the set can reproduce the shared key of the final key pair based on the given shared key for the previous pair and the observations of the communications between all subsequent pairs of nodes to identify valid bits in the key and invalid bits that were leaked. For example, in the system 100 the processor 108 in the node 104A identifies the shared key between the subsequent pair of nodes 104B and 104C based on the shared key ($K_{ab}$) with node 104B, that the processor 108 in the node 104A uses to reproduce the same pseudo-random bits that the node 104B uses during the transmission process with node 104C. The transceiver 112 in the node 104A also receives the same transmissions through the shared communication medium 102 that the nodes 104B and 104C receive, which enables the node 104A to store valid bits in the second shared key ($K_{bc}$) in the memory 120 based on the known transmissions from the node 104B and the observed valid and invalid bits through the communication medium 102. Thus, in the process 400 all prior nodes can reproduce the final shared key without requiring an additional transmission of the shared key through the shared communication medium 102.

The process 400 provides perfect forward secrecy, which is to say that even if an attacker compromises one node in the system 100 and gains knowledge of the shared secret data for the node, the knowledge the knowledge does not help the attacker in identifying previously generated shared keys. Additionally, in the system 100 even if the attacker 150 manages to compromise one of the nodes 104A-104D and learn the shared secret for the node, the knowledge of the shared secret in one node does not provide the attacker 150 with information that could compromise the shared secret in another node. For example, if the attacker 150 compromises node 104B and learns the shared secret $K_b$, this knowledge does not provide the attacker 150 with information about the other shared secret data $K_a$, $K_b$, and $K_c$.

Figure 6:
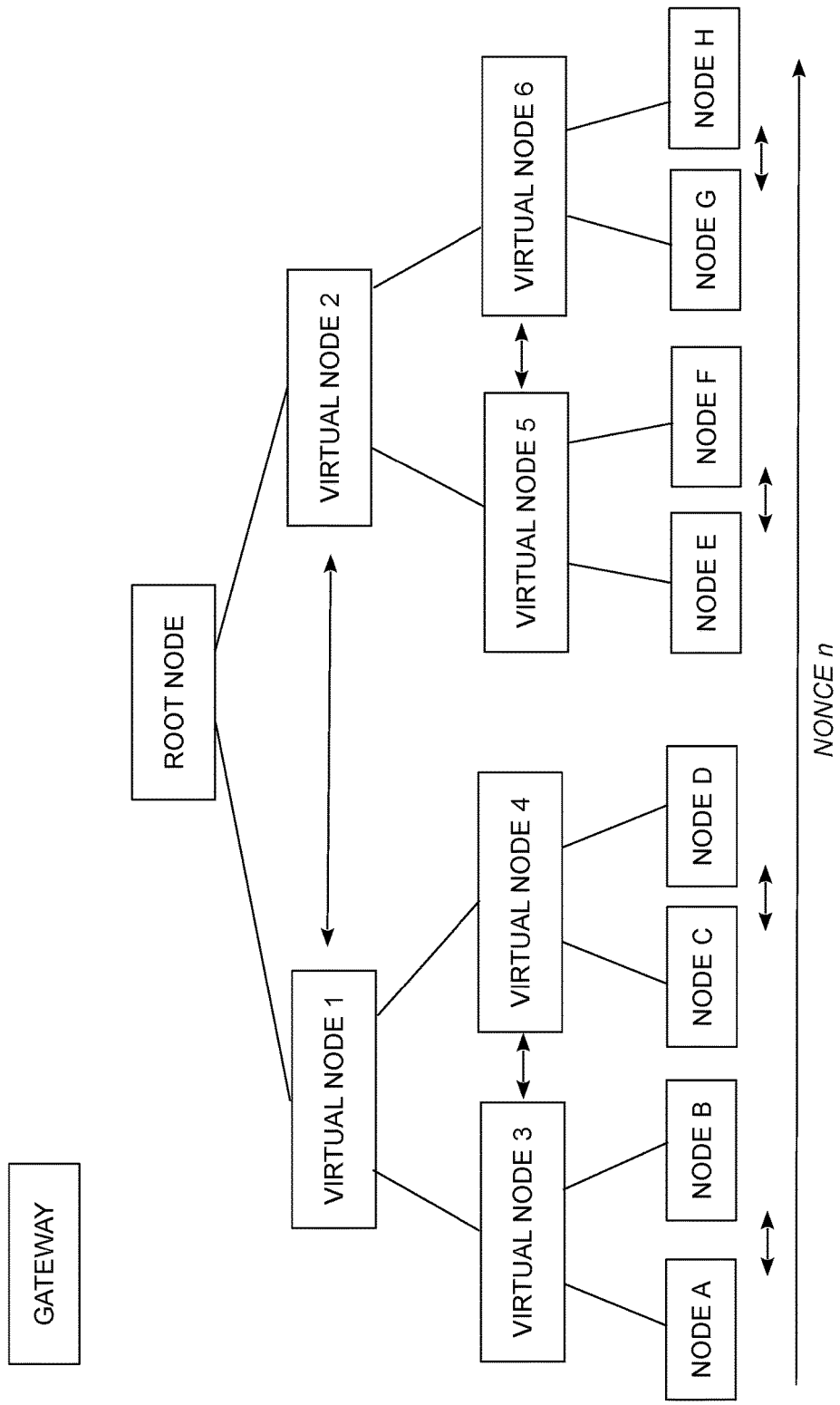
FIG. 6 is a diagram of a tree structure for multiple nodes that are connected to a shared communication medium and generate shared keys with authentication by a gateway node.

In another configuration of the system 100, a set of nodes generate a shared key using a logical tree structure where each node represents a leaf in the tree and pairs of nodes form "virtual nodes" with successively higher levels of virtual node pairs in a balanced tree hierarchy with a top-level "root" node that corresponds to a shared key that all of the nodes in the tree use for message encryption, decryption, and authentication. FIG. 6 depicts an illustrative embodiment of a tree structure. In FIG. 6, the nodes A-H each represent a physical device in a network that communicate through a shared communication medium in a similar configuration to the system 100 of FIG. 1. The virtual nodes 1-6 are each formed to represent either a pair of physical nodes (e.g. virtual node 3 corresponds to the pair of physical nodes A and B) or a pair of lower-level virtual nodes (e.g. virtual node 1 corresponds to the pair of virtual nodes 3 and 4). One child node in the system performs the functions for shared key exchange for each corresponding virtual node, with one illustrative embodiment using the physical node that is the left-most child node to represent each virtual node (e.g. node A represents virtual nodes 3, 1, and the Root node in the tree of FIG. 6; node E represents virtual nodes 5 and 2, etc.).

Figure 5:
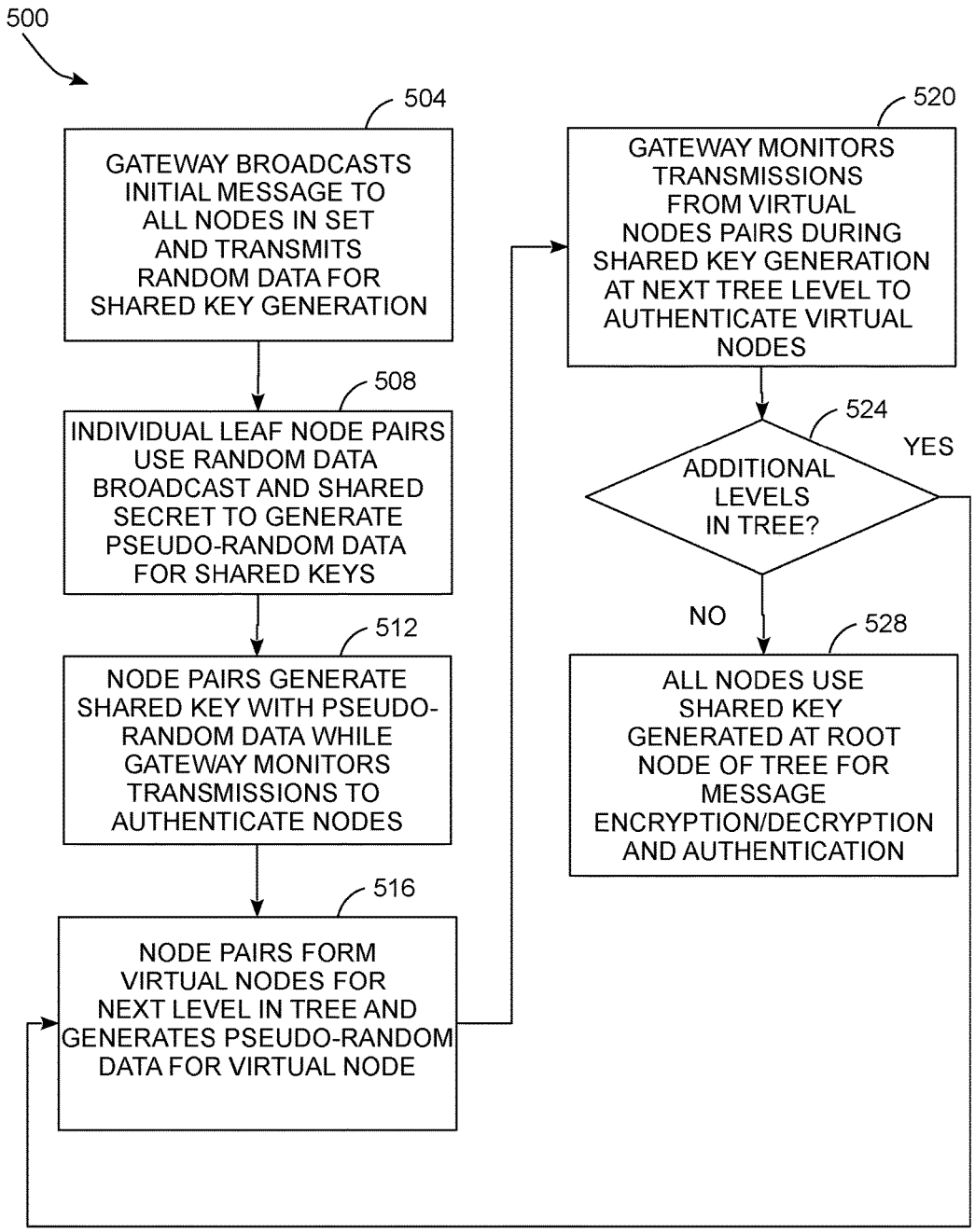
FIG. 5 is a block diagram of a process for process for authenticated shared key generation between a plurality of nodes arranged in a logical tree structure that communicate using a shared communication medium.

FIG. 5 depicts a process 500 for performing authentication during a shared key generation process. In the discussion below, a reference to the process 400 performing a function or action refers to the operation of one or more processors to execute stored program instructions to perform the function or action in conjunction with other components in a node and a communication system. The process 500 is described in conjunction with the system 100 of FIG. 1 for illustrative purposes.

The process 500 begins as the gateway node, such as the gateway node 160 in the system 100, broadcasts an initial message through the shared communication medium 102 to identify the nodes that are included in the set and the relative order of nodes, optionally specify the length of the shared key N, and a set of random data g that is broadcast, without encryption, to all nodes in the system including a potential attacker (block 504). In one embodiment, the gateway node 160 transmits N bits of the random data g matching the length of the shared key, and the individual nodes use the one-way function to generate larger amounts of pseudo-random data (e.g. 2N or more bits as needed) based on the initial N bits of the random data g and their shared secret data along with a counter. In another embodiment, the gateway node 160 transmits a larger pool of random data since the random data g serves as the initial set of random key data for shared key generation in a plurality of pairs of nodes instead of only for a single node pair. In still other embodiments, the gateway node 160 transmits supplemental random data g' in the event that one or more pairs of nodes exhaust the initial set of random data prior to generating a shared key.

The process 500 continues as each pair of nodes in the set produces pseudo-random data for generation of a shared key based on the shared secret with the gateway node 160 and the random data g (block 508). For example, the nodes A and B in FIG. 6 each generate pseudo-random data using the one-way function applied to a combination of the shared secret and the random data g. In one configuration, the node A generates a first set of pseudo-random data with 2N bits: $f(K_a, g) \| f(K_a, g+1)$ and the node A can generate additional bits of pseudo-random data as needed by incrementing the random data g and applying the one-way function presented above. The node B performs the same process using the shared secret data $K_b$. The gateway node 160 has the shared secret data of all the nodes stored in memory and applies the one-way function $f$ to the shared secret data and random data in the same manner as the selected nodes to enable the gateway node 160 to identify the expected transmissions that should occur from authorized nodes in the set.

Process 500 continues as the node pairs generate shared keys while the gateway node 160 monitors the transmissions between pairs of nodes to perform authentication (block 512). The node pairs each form a shared key using process 200 with the pseudo-random data that is generated in the processing of block 508. The gateway node 160 monitors the communications between pairs of nodes and compares the transmissions to the expected bit transmissions that authentic nodes with access to the proper shared secret data should produce. If the observed transmissions deviate from the expected transmissions, the gateway node 160 terminates the key generation process and optionally generates an alert to indicate that an attacker may be connected to the shared communication medium. Otherwise, the process 500 continues after the individual pairs of nodes that form the leaves of the tree structure have generated shared keys that the gateway node 160 determines to be authentic.

As depicted in FIG. 6, the tree structure includes virtual nodes that represent a pair of lower level nodes in the tree, such as the virtual node 3 that corresponds to the pair of leaf nodes A and B. The process 500 continues with generation of additional pairs of keys between virtual nodes at the next level of the tree (block 516). The physical node that represents each virtual node uses a set of pseudo-random data using the one-way function applied to shared key from the previous level of the tree and the random data g from the gateway to generate a new set of pseudo-random data for exchange with another virtual node. For example, in the tree 600, the processor in the virtual node 3, which is represented by physical node A in the illustrative embodiment of FIG. 6, generates a set of pseudo-random data with at least 2N bits: $f(K_{ab}, g) \| f(K_{ab}, g+1)$ where $K_{ab}$ is the shared key that was previously generated between the nodes A and B that form the virtual node 3. The gateway node 160, which has the pair key $K_{ab}$ and the random data g stored in memory, also reproduces the pseudo-random data for each of the virtual keys. Furthermore, the leaf nodes also reproduce the pseudo-random data for parent nodes, although not for non-parent virtual nodes. The child nodes monitor the communication medium to identify the successfully transmitted bits that form the shared keys for any parent nodes in the tree (e.g. node B identifies the shared keys that are generated for the virtual node 3, virtual node 1, and the root node, which is a parent to every leaf node in the set).

The process 500 continues as the gateway monitors transmissions between each pairs of virtual nodes in the next level of the tree to ensure that the virtual nodes transmit the expected bit values (block 520). The virtual nodes generate shared keys using the pseudo-random data generated during block 516 using the process 200. Once again, the gateway node 160 receives the transmitted bits through the shared communication medium 102 and authenticates each virtual node if the virtual node transmits the expected bits that can only be produced with knowledge of the shared key from the next lower level in the tree.

The process 500 continues with the processing of blocks 516-620 for any additional levels of virtual nodes in the tree (block 524). After completion of the shared key generation process with successful authentication of all nodes in the tree, the leaf nodes all use the shared key that is generated for the final pair of virtual nodes at the root node of the tree as the shared key for all of the nodes in the set (block 528). The nodes in the set use the shared key to perform message encryption and decryption and authentication using techniques that are otherwise known to the art. As described above, each node in the tree can generate the shared key of any parent virtual nodes, and the root node is a parent node to all nodes in the tree that produces a shared key that is known to all nodes in the tree.

The shared key generation and authentication process 500 that employs the tree structure lacks the perfect forward secrecy aspects of the methods of FIG. 3 and FIG. 4 because all nodes in the system use the same set of random data than an attacker could record and use to reproduce an old shared key if the attacker were to gain access to the shared secret data in one of the nodes A-H shown in the tree of FIG. 6. However, the system 100 can generate and authenticate shared keys using the tree structure with reduced communication requirements between the nodes compared to the methods of FIG. 3 and FIG. 4.

Figure 8:
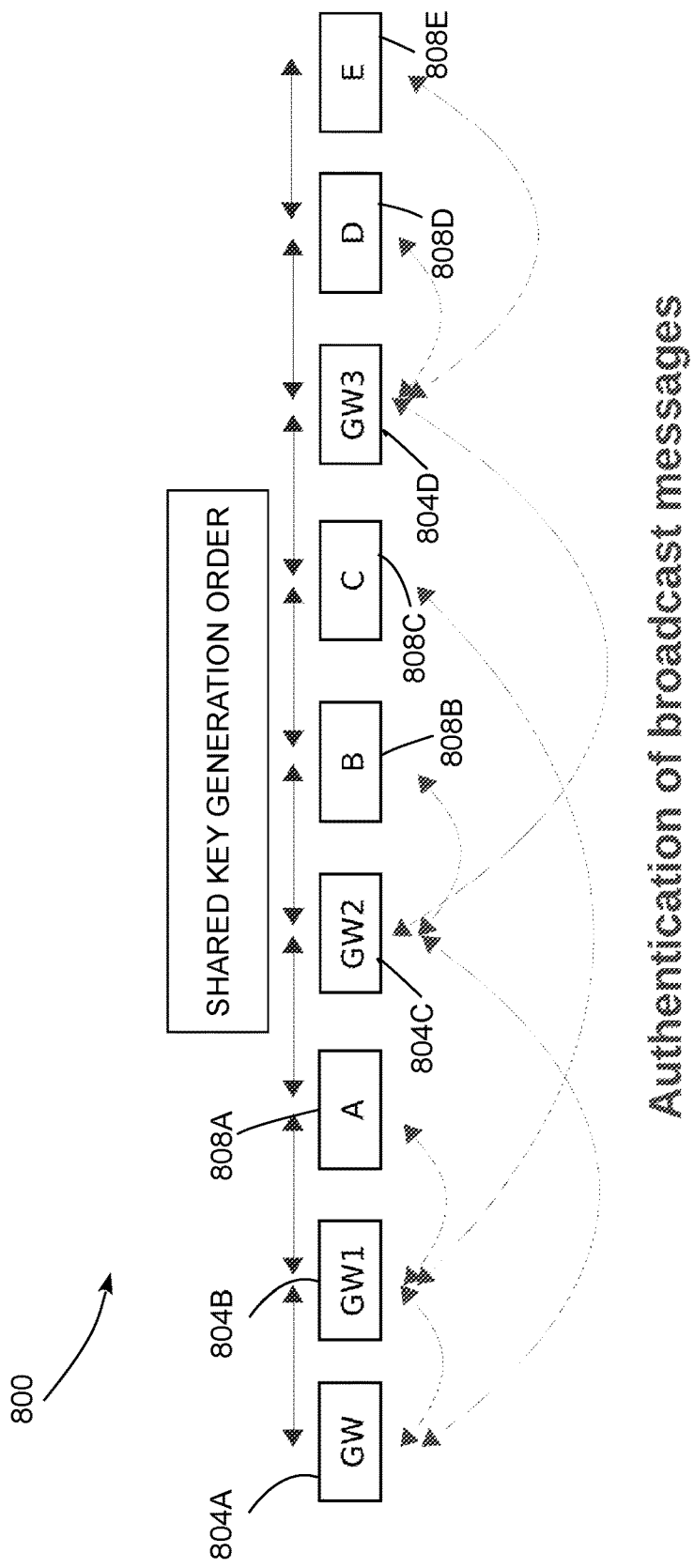
FIG. 8 is a schematic diagram of a distributed network structure that includes multiple gateway nodes.

The illustrative embodiment of FIG. 1 includes a single gateway node 160 that performs authentication for the shared key generation processes of the nodes 104A-104D that are connected to a single shared communication medium 102. More complex embodiments include multiple gateways that are each configured to authenticate the communications for different sets of nodes. FIG. 8 depicts an example another communication network 800 including gateways 804A-804D and individual nodes 808A-808E in a communication network. In the network 800, the gateway nodes 804A-804D and the individual nodes 808A-808E perform pair-wise shared key generation processes in the predetermined order shown in FIG. 8 starting from a root gateway (gateway 804A) and proceeding through individual gateways and the individual nodes in a predetermined order with each pair of nodes exchanging data to generate a shared key using the process 200 described above. As depicted in FIG. 8, the authentication process for shared key generation between pairs of nodes always relies upon at least one of the gateway nodes to monitor the broadcast communications and verify the authenticity of the nodes that are participating in the shared key generation process using a shared secret between the nodes. For example, in FIG. 8 the first gateway 804A authenticates the additional gateways 804B and 804D. The gateway 804B, in turn, authenticates nodes 8080A and 808C, gateway 804C authenticates nodes 808B and 804D, and the gateway 804D authenticates nodes 808D and 808E. The arrangement of gateway nodes in the system 800 reduces the number of shared secrets that each individual gateway node stores in memory, which in turn reduces the potential impact of an attacker gaining access to shared secret data in one of the gateway nodes. In the embodiment of FIG. 8, each gateway node is responsible for authenticating two other nodes, which may be another gateway or an ordinary node in the system 800, although different system configurations can associate a different number of nodes with each gateway.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for shared key generation with authentication comprising:

generating, with a processor in a gateway node communicatively connected to a first node and a second node through a shared communication medium, a first set of pseudo-random data corresponding to expected transmissions from the first node based on a predetermined one-way function applied to a first shared key between the first node and the gateway node;

identifying, with the processor in the gateway node, a plurality of bits transmitted from the second node based on a plurality of signals received by a transceiver in the gateway node communicatively connected to the shared communication medium, the plurality of signals corresponding to a plurality of simultaneous transmissions from the first node and the second node to generate a shared key between the first node and the second node, each simultaneous transmission including the first node transmitting at least one first bit at a transmit time and the second node transmitting at least one second bit at the transmit time, wherein the at least one first bit and the at least one second bit are transmitted through the shared communication medium at the same time;

identifying, with the processor in the gateway node, a plurality of expected bit values for at least a portion of the second plurality of bits transmitted from the second node based at least in part on applying the predetermined one-way function to a combination of shared secret data between the gateway node and the second node stored in a memory of the gateway node with another set of random data generated by the second node;

authenticating, with the processor in the gateway node, the second node in response to the plurality of bits transmitted from the second node matching the plurality of expected bit values;

generating, with a random number generator in the gateway node, a plurality of random bits of data;

exchanging, with the transceiver in the gateway node the plurality of random bits with the first node by transmitting the plurality of random bits while receiving another plurality of random bits during simultaneous transmissions from the first node to produce a plurality of shared bits between the gateway node and the first node;

generating, with the processor in the gateway node, the first shared key between the gateway node and the first node by applying the one-way function to a combination of shared secret data between the gateway node and the first node stored in the memory of the gateway node and the plurality of shared bits between the gateway node and the first node;

generating, with the random number generator in the gateway node, a nonce value;

generating, with the processor in the gateway node, an encrypted version of the nonce value using the first shared key;

transmitting, with the transceiver in the gateway node, the encrypted version of the nonce value to the first node;

receiving, with the transceiver in the gateway node, a transformed nonce value from the first node, the transformed nonce corresponding to a predetermined numeric transformation applied to the nonce value by the first node after the first node decrypts the encrypted version of the nonce using the first shared key; and authenticating, with the processor in the gateway node, the first node in response to the transformed nonce value received from the first node matching another transformed nonce value generated by the processor in the gateway node applying the predetermined numeric transformation to the nonce value generated by the random number generator in the gateway node.

2. The method of claim 1, the identifying the plurality of bits transmitted from the second node further comprising:

receiving with the transceiver in the gateway node a first signal from the shared communication medium corresponding to a simultaneous transmission of a first bit from the first node and a second bit from the second node;

receiving with the transceiver in the gateway node a second signal from the shared communication medium corresponding to a simultaneous transmission of a logical complement of the first bit from the first node and a logical complement of the second bit from the second node; and identifying, with the processor in the gateway node, one bit in the plurality of bits transmitted from the second node with reference to the first signal and the second signal.

3. The method of claim 2 further comprising:

identifying, with the processor in the gateway node, the one bit in the plurality of bits transmitted from the second node being a logical complement of a corresponding bit in the first set of pseudo-random data for the first node in response to a first level of the first signal and a second level of the second signal being the same.

4. The method of claim 1 wherein the processor in the gateway node increments the nonce value generated by the random number generator in the gateway node by a predetermined value to match the transformed nonce value received from the first node.

5. The method of claim 1 further comprising:

transmitting, with the transceiver in the gateway node, a message to cancel generation of the shared key between the first node and the second node in response to identifying, with the processor in the gateway node, at least one bit in the second plurality of bits transmitted from the second node that does not match a corresponding bit in the plurality of expected bit values.

6. The method of claim 1 wherein the transceiver in the gateway node receives the plurality of signals through a Controller Area Network bus shared communication medium.

* * * * *